United States Patent
Xue

(10) Patent No.: US 8,072,767 B2
(45) Date of Patent: Dec. 6, 2011

(54) EXPANSION CARD MOUNTING ASSEMBLY

(75) Inventor: Yuan Xue, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 360 days.

(21) Appl. No.: 12/422,353

(22) Filed: Apr. 13, 2009

(65) Prior Publication Data

US 2010/0103602 A1   Apr. 29, 2010

(30) Foreign Application Priority Data

Oct. 23, 2008 (CN) .......................... 2008 2 0302533

(51) Int. Cl.
- *H05K 5/00* (2006.01)
- *H05K 7/16* (2006.01)
- *H04M 1/00* (2006.01)
- *A47B 81/00* (2006.01)

(52) U.S. Cl. ........ 361/755; 361/726; 361/727; 361/759; 455/575.3; 312/223.1; 312/223.2

(58) Field of Classification Search .......... 361/724–837, 361/681, 683, 679.01, 801, 804, 679.29, 361/679.55; 312/223.1, 223.2
See application file for complete search history.

(56) References Cited

U.S. PATENT DOCUMENTS

| | | | |
|---|---|---|---|
| 6,578,939 B1 * | 6/2003 | Mayer | 312/334.5 |
| 7,326,077 B2 * | 2/2008 | Shih et al. | 439/372 |
| 7,388,759 B2 | 6/2008 | Chen et al. | |
| 2007/0167064 A1 * | 7/2007 | Shih et al. | 439/372 |

* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

An expansion card mounting assembly includes an expansion card, a rear wall, and a rotating member. The expansion card includes a slot cover which has a bent portion. The rear wall defines a slot to receive the slot cover covered thereon in a first direction. A support piece is formed on the rear wall and above the slot to support the bent portion when the slot cover is covered on the slot of the rear wall. The rotating member is mounted on the rear wall, and rotatable on the rear wall about a second direction substantially parallel to the first direction. The rotating member includes a pressing board to press the bent portion against the support piece after the rotating member rotates in the second direction to a locked position.

11 Claims, 4 Drawing Sheets

EXPANSION CARD MOUNTING ASSEMBLY

BACKGROUND

Relevant subject matter is disclosed in a U.S. patent (U.S. Pat. No. 7,388,759; ) filed on Dec. 29, 2005 and entitled "MOUNTING ASSEMBLY FOR EXPANSION CARDS", which is assigned to the same assignee as this patent application.

1. Technical Field

The disclosure relates to mounting assemblies and, particularly, to a mounting assembly which readily and firmly secures a plurality of expansion cards in a computer chassis.

2. Description of Related Art

Currently, many computer systems and other electronic devices employ circuit cards, such as expansion cards, adapters, and PC boards. These cards or boards are typically mounted perpendicularly to a computer motherboard. In particular, the cards are usually inserted into edge card connectors mounted on the computer motherboard. However, merely inserting a card into an edge card connector is typically insufficient to securely maintain the card within the computer chassis. Cards connected in this fashion can easily disconnect from the edge connector, which may prevent, or significantly inhibit, acceptable operation of the computer. Accordingly, additional structure is used to secure a card within a computer chassis. A conventional manner of securing a card within a computer chassis is to provide a card bracket fastened to the computer chassis with a removable screw. Specifically, each mounting bracket is normally disposed across a card slot formed in the computer chassis and may include an aperture through which the fastener may pass. However, securing a card-mounting bracket to a computer chassis in this manner may present problems. One significant disadvantage of a screw-secured bracket is that the fastener is often inadvertently dropped into the computer chassis during installation and removal of the bracket.

Therefore, there is room for improvement within the art.

DETAILED DESCRIPTION

Figure 1:
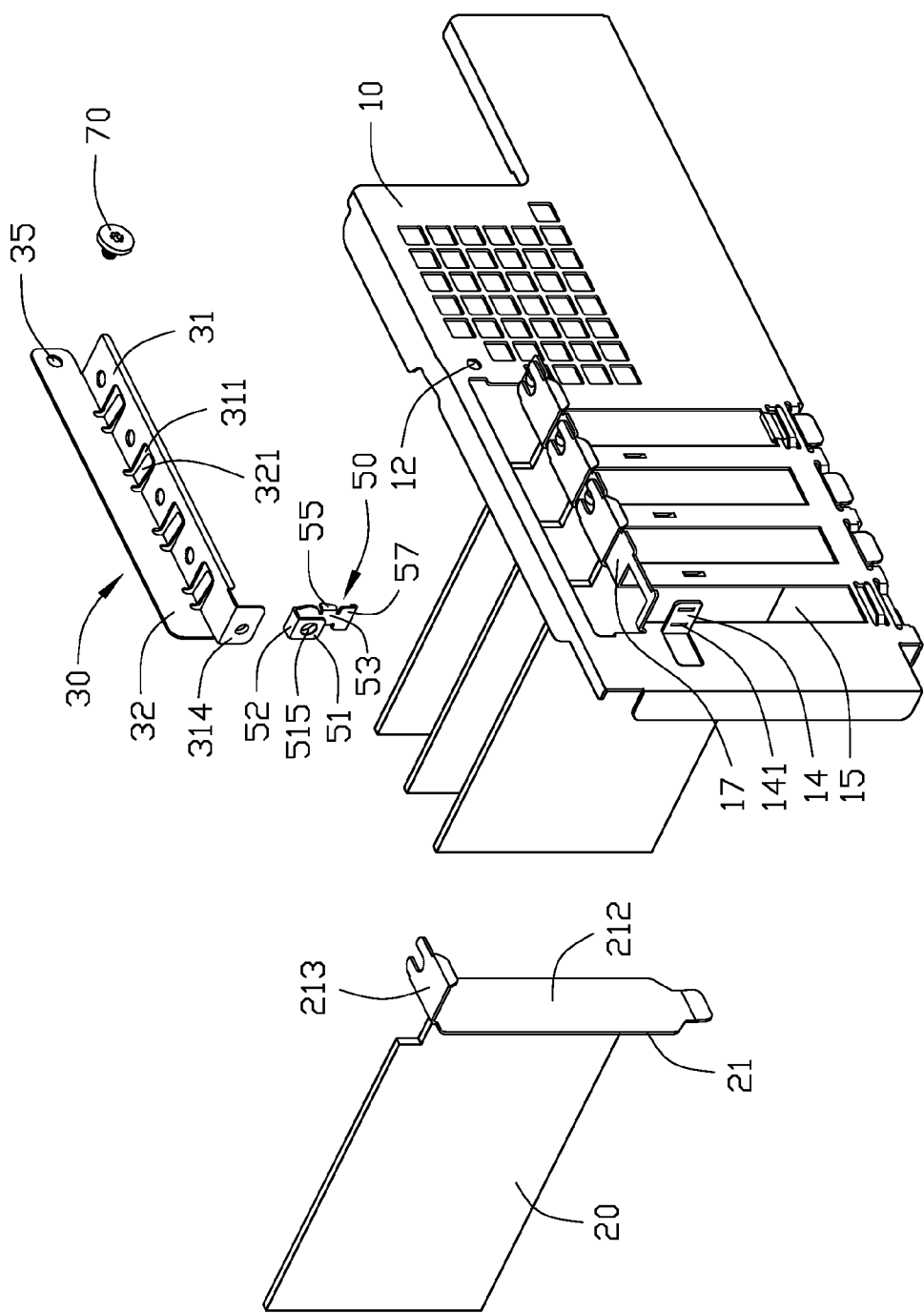
FIG. 1 is an exploded, isometric view of an embodiment of a mounting assembly, the mounting assembly including a rear panel of a computer chassis, a fastener, a rotating member, and a plurality of expansion cards.

Referring to FIG. 1, a mounting assembly for a plurality of expansion cards 20 includes a rear wall 10 of a chassis, a rotating member 30, and a fastener 50.

A horizontal support piece 17 protrudes from a rear side of the rear wall 10. A plurality of slots 15 is defined in the rear wall 10, below the support piece 17. A fastening hole 12 is defined in the rear wall 10 for receiving a fastener 70 engaged therein. A bent piece 14 is formed on the real wall 10. The fastening hole 12 is located adjacent one end of the support piece 17, and the bent piece 14 is located adjacent the other end of the support piece 17. A pair of locking apertures 141 is defined in the bent piece 14.

The expansion card 20 includes a slot cover 21. The slot cover 21 is generally "L"-shaped, which includes a main body 212 to cover the slot 15 of the rear wall 10, and a bent portion 213 bent from a top end of the main body 212.

Figure 2:
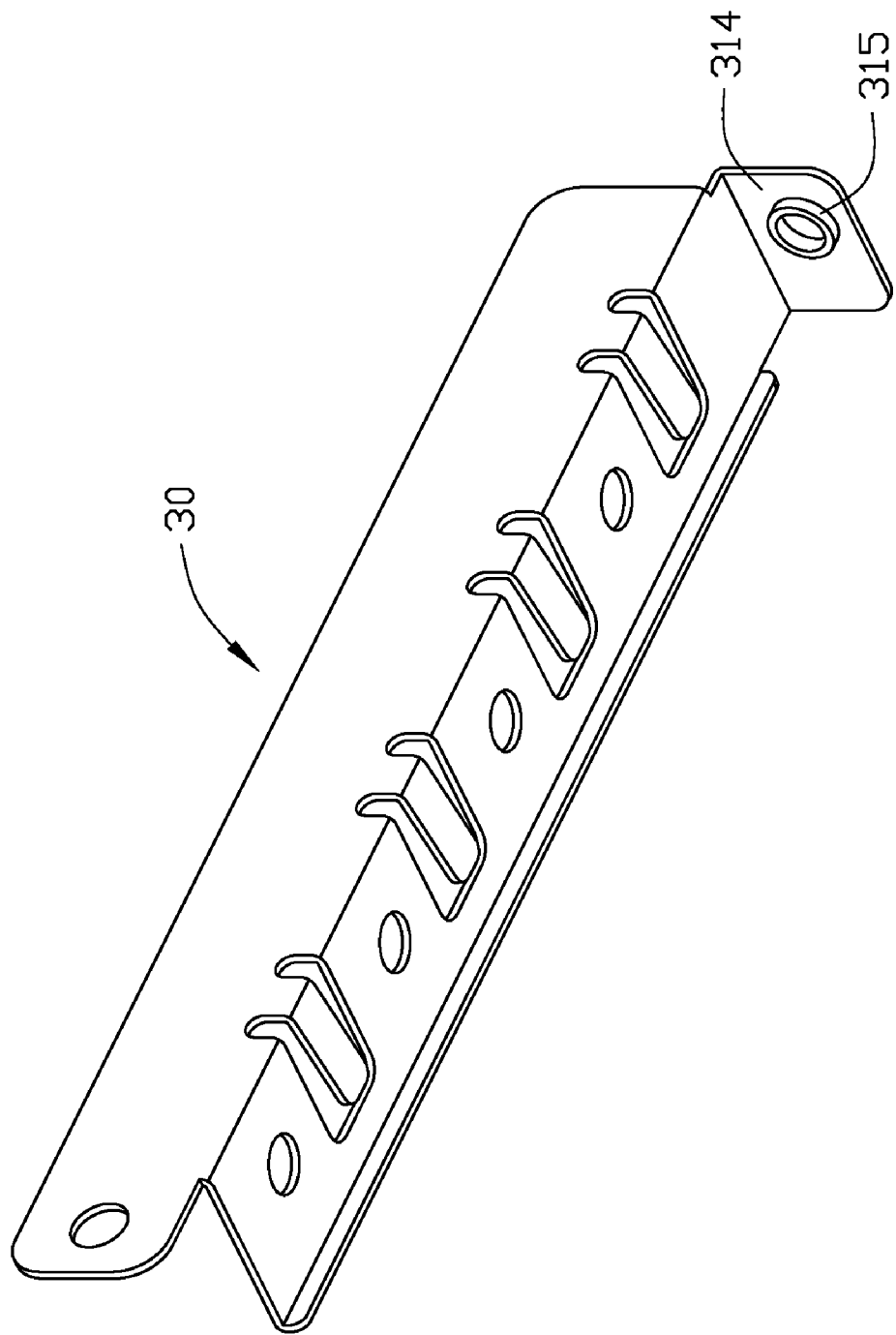
FIG. 2 is an enlarged view of the rotating member of FIG. 1, but viewed from another aspect.

Referring to FIGS. 1 and 2, the rotating member 30 includes a horizontal pressing board 31 and a vertical guiding board 32 formed on one edge of the pressing board 31. A plurality of cutouts 311 is defined in the pressing board 31. The guiding board 32 forms a plurality of tongue pieces 321 received in the cutouts 311. Each of the plurality of tongue pieces 321 is tilted with a free end of each tongue piece 321 protruding from a bottom of the pressing board 31. A pivot hole 35 is defined in the guiding board 32, adjacent to one end of the rotating member 30. The pivot hole 35 is larger than the fastening hole 12 of the rear wall 10. A tab 314 is formed on the pressing board 31, on the other end of the rotating member 30. An inserting post 315 is formed on the tab 314.

The fastener 50 is generally η-shaped, and includes a first piece 51, a second piece 53 substantially parallel to the first piece 51, and a connecting piece 52 connected between the first piece 51 and the second piece 53. The first piece 51 and the second piece 52 are located face to face. The second piece 53 is longer than the first piece 51. The first piece 51 defines an inserting hole 515 to receive the inserting post 315 therein. The second piece 53 forms a pair of clasps 55 thereon. The pair of clasps 55 extends away from the first piece 51. A pull portion 57 is formed on a bottom end of the second piece 53 to allow the second pieces 53 to bend.

Figure 3:
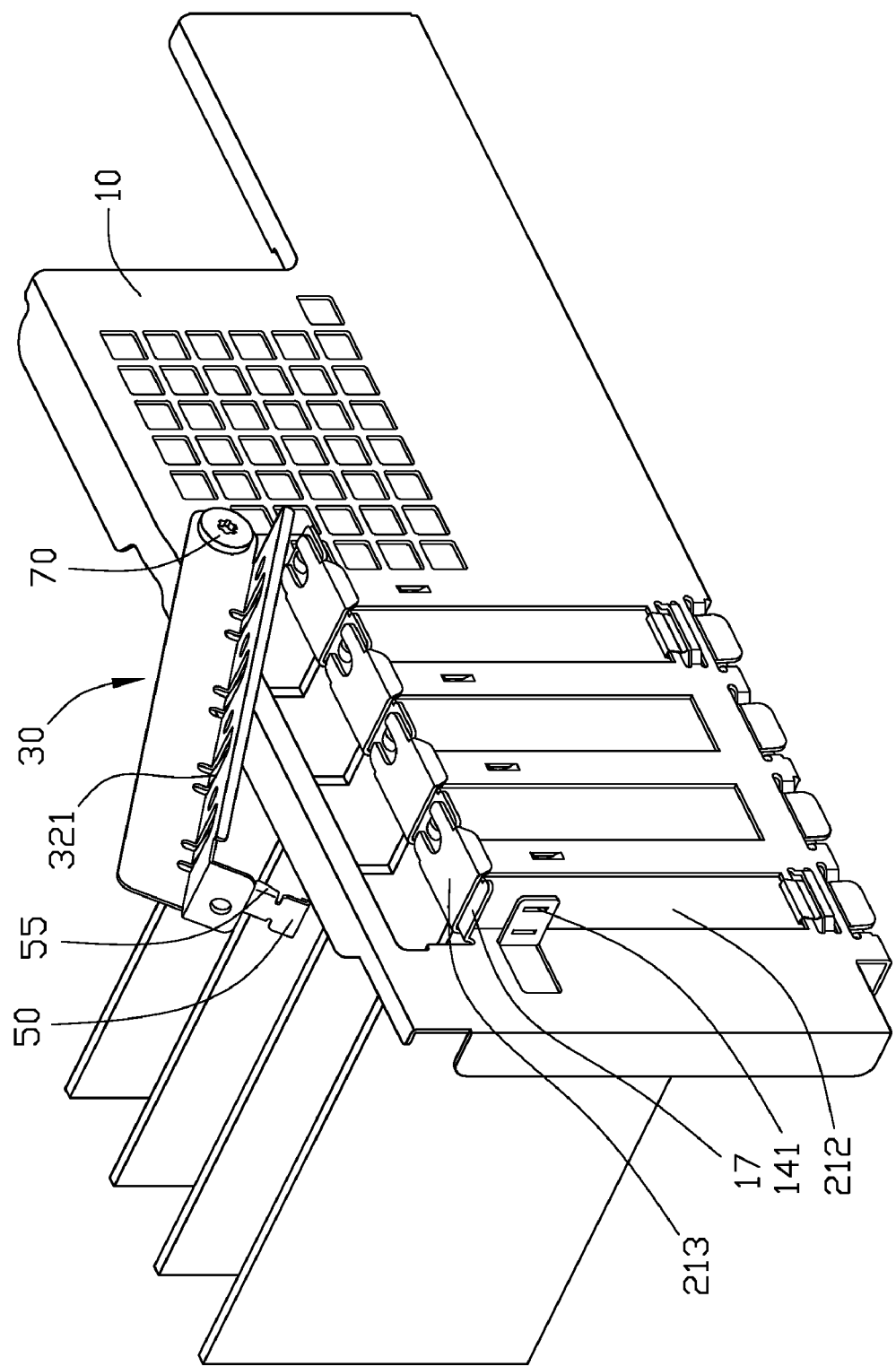
FIG. 3 is a pre-assembly view of the mounting assembly of FIG. 1.
Figure 4:
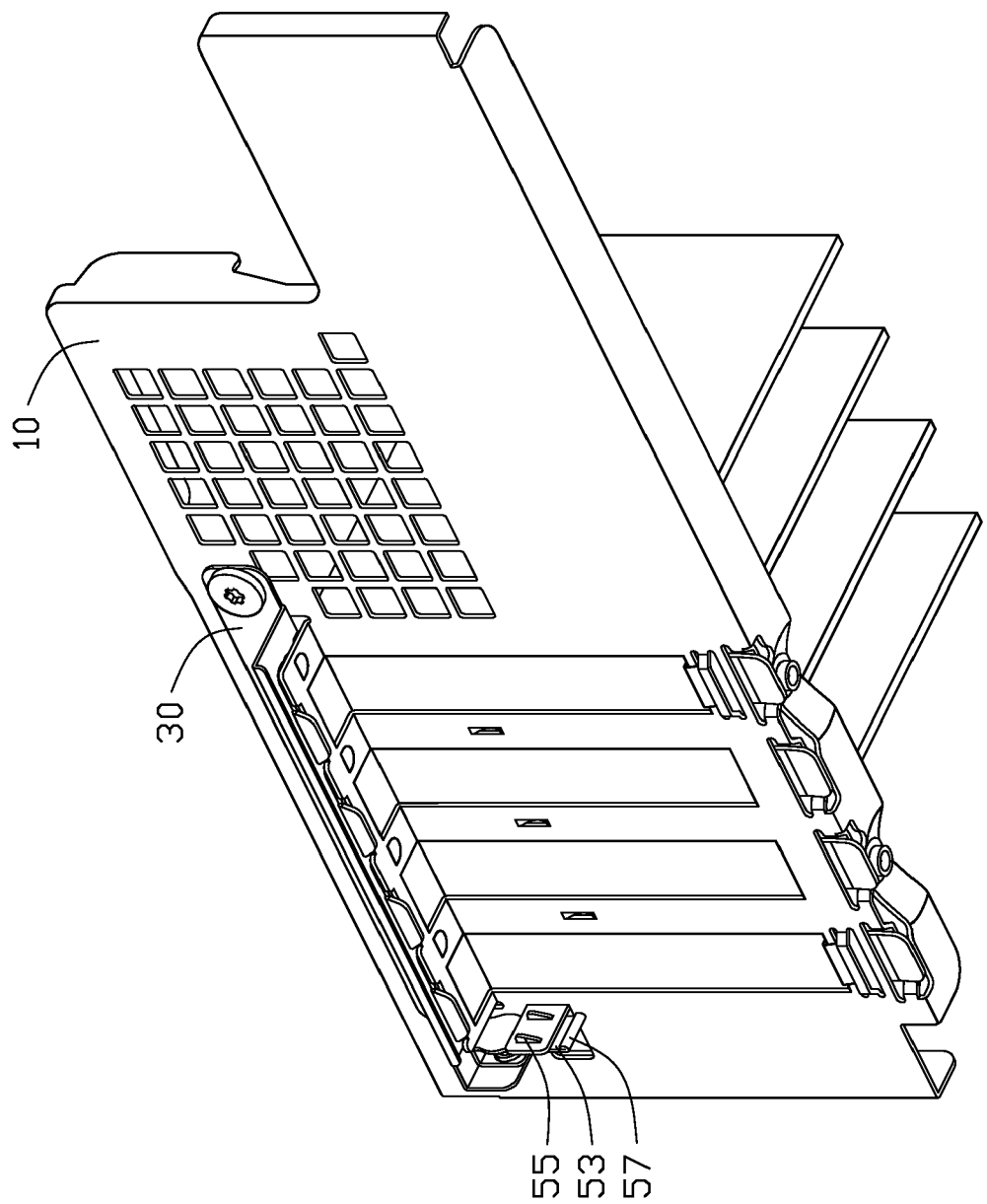
FIG. 4 is an assembled view of the mounting assembly of FIG. 1.

Referring to FIGS. 1, 3, and 4, the inserting post 315 of the rotating member 30 is received in the inserting hole 515 of the fastener 50 to mount the fastener 50 on the rotating member 30. The guiding board 32 of the rotating member 30 is then placed on the rear wall 10 with the pivot hole 35 of the guiding board 32 aligned with the fastening hole 12 of the rear wall 10. A fastener 70 passes through the pivot hole 35 and is engaged in the fastening hole 70. Thereby, the rotating member 30 is capable of rotating on the rear wall 10 around the fastener 70.

The expansion card 20 is then moved in a first direction towards the rear wall 10 to cover a slot 15 of the rear wall 10. The bent portion 213 of the slot cover 21 is placed on the support piece 17 of the rear wall 10. The rotating member 30 rotates on the rear wall 10 about a second direction substantially parallel to the first direction with the guiding board 32 sliding along the rear wall 10. The rotating member 30 rotates until the pressing board 31 contacts the bent portion 213 of the expansion card 20. The tongue pieces 321 of the rotating member 30 are elastically deformed, and exert an elastic force on the bent portion 213 to securely sandwich the bent portion 213 between the support piece 17 and the tongue pieces 321. The fastener 50 mounted on the rotating member 30 rotates together with the rotating member 30. The clasps 55 of the fastener 50 are received and clasped in the locking apertures 141 of the bent piece 14, thereby firmly locking the rotating member 30 at a locked position on the rear wall 10.

To detach the expansion card 20, the pull portion 57 of the fastener 50 is pulled to bend the second piece 53. The clasps 55 on the second piece 53 disengage from the locking apertures 141 of the supporting piece 17. The rotating member 30 is rotated until the tongue pieces 321 no longer contact the bent portion 213 of the expansion card 20, and the expansion card 20 can be detached from the rear wall 10.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An expansion card mounting assembly, comprising:
an expansion card comprising a slot cover having a bent portion;
a rear wall of a chassis defining a slot to receive the slot cover covered thereon in a first direction, and having a support piece formed on the rear wall and above the slot to support the bent portion when the slot cover is covering the slot of the rear wall; and
a rotating member mounted on the rear wall, rotatable on the rear wall about a second direction substantially parallel to the first direction, the rotating member comprising a horizontal pressing board to press the bent portion against the support piece after the rotating member rotates about the second direction to a locked position; and
a fastener mounted on the rotating member, the fastener being η-shaped and comprising a first piece mounted on the rotating member and a second piece substantially parallel to the first piece, the first piece and the second piece located face to face, the second piece being longer than the first piece, a connecting piece connected between the first piece and the second piece, the second piece comprising a clasp, and the rear wall defining a locking aperture for the clasp to engage therein to lock the rotating member in the locked position;
wherein the rotating member further comprises a vertical guiding board formed on one edge of the horizontal pressing board, the vertical guiding board is perpendicular to the horizontal pressing board, and the vertical guiding board slides along the rear wall to guide the rotating member to rotate to the locked position.

2. The expansion card mounting assembly of claim 1, wherein a pull portion is formed on a bottom end of the second piece to enable the second piece to bend.

3. The expansion card mounting assembly of claim 1, wherein an inserting hole is defined in the first piece, and an inserting post formed on the rotating member is received therein to secure the fastener on the rotating member.

4. The expansion card mounting assembly of claim 1, wherein the fastener is mounted on one end of the rotating member, and a pivoting hole is defined on the other end of the rotating member, whereby the rotating member rotates on the rear wall around the pivoting hole.

5. The expansion card mounting assembly of claim 1, wherein a plurality of cutouts is defined in the pressing board, and the guiding board forms a plurality of tongue pieces received in the cutouts, each tongue piece is tilted with a free end protruding from a bottom of the pressing board to firmly contact the bent portion of the slot cover.

6. An expansion card mounting assembly, comprising:
an expansion card comprising a slot cover having a bent portion;
a rear wall of a chassis defining a slot to receive the slot cover thereon, and a support piece formed on the rear wall to support the bent portion when the slot cover is covering the slot of the rear wall;
a rotating member pivotally mounted on the rear wall, the rotating member comprising a pressing board with a plurality of cutouts defined therein, the rotating member forming a plurality of tongue pieces received in the cutouts, each tongue piece is tilted with a free end protruding from a bottom of the pressing board to firmly press against the bent portion of the slot cover when the rotating member rotates to a locked position on the rear wall;
a fastener mounted on the rotating member, the fastener being η-shaped and comprising a first piece mounted on the rotating member and a second piece substantially parallel to the first piece, the first piece and the second piece located face to face, the second piece being longer than the first piece, a connecting piece connected between the first piece and the second piece, the second piece comprising a clasp, and the rear wall defining a locking aperture for the clasp to engage therein to lock the rotating member on the rear wall.

7. The expansion card mounting assembly of claim 6, wherein the expansion card is covered in a first direction to cover the slot, and the rotating member rotates about a second direction substantially parallel to the first direction to press the pressing board against the bent portion of the slot cover.

8. The expansion card mounting assembly of claim 6, wherein a pull portion is formed on a bottom end of the second piece to enable the second piece to bend.

9. The expansion card mounting assembly of claim 6, wherein an inserting hole is defined in the first piece, and an inserting post formed on the rotating member is received therein to mount the fastener on the rotating member.

10. The expansion card mounting assembly of claim 6, wherein the fastener is mounted on one end of the rotating member, and a pivoting hole is defined on the other end of the rotating member, whereby the rotating member rotates on the rear wall around the pivoting hole.

11. The expansion card mounting assembly of claim 6, wherein the rotating member further comprises a vertical guiding board formed on one edge of the horizontal pressing board, the vertical guiding board is perpendicular to the horizontal pressing board, and the vertical guiding board slides along the rear wall to guide the rotating member to rotate on the rear wall.

* * * * *